United States Patent [19]

Chiu

[11] Patent Number: 4,719,291

[45] Date of Patent: Jan. 12, 1988

[54] PHENOLIC COMPOUND-MODIFIED SPENT SULFITE LIQUOR AND PROCESS FOR PREPARING SAME

[75] Inventor: Shui-Tung Chiu, Coquitlam, Canada

[73] Assignee: Borden Company Limited, West Hill, Canada

[21] Appl. No.: 776,668

[22] Filed: Sep. 16, 1985

[30] Foreign Application Priority Data

May 9, 1985 [CA] Canada ................................. 481180

[51] Int. Cl.$^4$ .............................................. C07G 1/00
[52] U.S. Cl. ................................................. 530/502
[58] Field of Search ........................................ 530/502

[56] References Cited

U.S. PATENT DOCUMENTS

| | | | |
|---|---|---|---|
| 2,168,160 | 8/1939 | Hochwalt et al. | 260/53 |
| 2,282,518 | 5/1942 | Hochwalt et al. | 260/53 |
| 2,385,586 | 9/1945 | Rudy et al. | 260/17.5 |
| 2,470,764 | 5/1949 | Dunbar | 92/11 |
| 2,491,832 | 12/1949 | Salvesen et al. | 530/501 |
| 2,505,304 | 4/1950 | Salvesen et al. | 530/501 |
| 2,772,139 | 11/1956 | Marshall et al. | 8/94.31 |
| 2,772,140 | 11/1956 | Marshall et al. | 8/94.31 |
| 2,786,008 | 3/1957 | Herschler | 154/132 |
| 2,794,790 | 6/1957 | Marshall et al. | 260/17.5 |
| 2,849,314 | 8/1958 | Goss | 92/3 |
| 2,891,918 | 6/1959 | Uschmann | 260/17.5 |
| 3,071,570 | 1/1963 | Marton et al. | 530/501 |
| 3,093,605 | 6/1963 | Ayers | 260/17.2 |
| 3,093,606 | 6/1963 | Ayers | 260/17.2 |
| 3,388,061 | 6/1968 | Markham | 252/8.5 |
| 3,476,740 | 11/1969 | Markham et al. | 530/501 |
| 3,544,460 | 12/1970 | Markham et al. | 530/501 |
| 3,551,405 | 12/1970 | Read | 530/501 |
| 3,597,375 | 8/1971 | Ludwig et al. | 260/17.5 |
| 3,658,638 | 4/1972 | Ludwig et al. | 161/262 |
| 3,677,884 | 7/1972 | Bornstein | 161/262 |
| 3,686,119 | 8/1972 | Markham et al. | 252/8.5 |
| 3,940,352 | 2/1976 | Wennerblom et al. | 260/17.5 |
| 4,127,544 | 11/1978 | Allan | 260/17.5 |
| 4,219,471 | 8/1980 | Detroit | 530/501 |
| 4,250,088 | 2/1981 | Yang | 530/501 |

OTHER PUBLICATIONS

*Chem. Abs.* 80:P147112y.
*Chem. Abs.* 98:73516f.
Nimz et al., *Appl. Polymer Symposium*, No. 28, John Wiley & Sons, Inc., pp. 1225–1230, (1976).
Sarkanen, in 27*th Int. Cong. of Pure and Appl. Chem.*, Varmavuori, A., Ed., Pergamon Press, Oxford, pp. 299–306, (1980).

*Primary Examiner*—Delbert R. Phillips
*Attorney, Agent, or Firm*—Robbins & Laramie

[57] ABSTRACT

A process for modifying spent sulfite liquor by reacting the liquor with a phenolic compound in the presence of an oxidizing agent is disclosed. The phenolic compound-modified spent sulfite contains 4%–25% reacted phenolic compound based on the dry weight of the original spent sulfite liquor. The modified liquor also contains a reduction in the sugars content and sulfonic acid groups of at least 20% each over the original liquor. The modified spent sulfite liquor is suitable for use in thermosetting resin formulations.

28 Claims, No Drawings

PHENOLIC COMPOUND-MODIFIED SPENT SULFITE LIQUOR AND PROCESS FOR PREPARING SAME

BACKGROUND OF THE INVENTION

1. Field of the Invention

The invention relates to a phenolic compound-modified spent sulfite liquor, such as a phenol-modified spent sulfite liquor, and to a process for preparing the same. The invention also relates to a thermosetting resin formulation which contains the phenolic compound-modified spent sulfite liquor.

2. Description of the Prior Art

Spent sulfite liquors are the by-product of sulfite pulping processes by which wood lignin is modified with sulfonic groups to render the lignin water soluble. They are commercially available in liquid and powder forms at relatively low cost. The spent sulfite liquor contains lignosulfonate, wood sugars, resins, organic acids and their residual pulping chemicals. Lignosulfonate and wood sugars represent about 50%–65% and 10%–25% on dry basis, respectively, and are the major components of spent sulfite liquor. Depending on the bases used for the original cooking chemical, the spent sulfite liquor contains ammonium, sodium, magnesium or calcium lignosulfonate.

Although spent sulfite liquors are low cost, they are seldom used for thermosetting resin formulations. The spent sulfite liquors are not used because of their limitations, which are: (1) the lignosulfonate molecules have insufficient reaction sites to react with formaldehyde and/or to cross-link with phenol-formaldehyde resin; (2) the cured resin has a high hydrophilic property due to the high content of sulfonic acid groups, and (3) the cured resin is vulnerable to biological degradation since the commercial spent sulfite liquors contain a high content of undesirable sugars.

Spent sulfite liquor may be used as an extender for phenol-formaldehyde resins. A mixture of spent sulfite liquor with a phenol-formaldehyde resin or a resin prepared by mixing spent sulfite liquor with phenol and then reacting it with formaldehyde has been suggested for adhesives to be used for wood product manufacture. However, the adhesion property of these resins are inferior to the conventional phenol-formaldehyde resins as a result of the undesired properties of the spent sulfite liquor previously described.

In order to increase the formaldehyde reactivity of spent sulfite liquor, the prior art has suggested modifying the lignosulfonate by condensing it with phenol. However, the condensation reaction is usually hampered since the phenol reacting sites of the lignin are preoccupied with sulfonic acid groups. Thus, a strong mineral catalyst, such as hydrochloric acid, and a high temperature, generally greater than 140° C., are required to induce the reaction. The disadvantage of the process is that it requires an acid-resistant and/or pressurized reactor. Moreover, the spent sulfite liquor may be condensed to such a degree that it is unable to dissolve in alkaline solution, and thus is not suitable for resin formulation.

For example, U.S. Pat. No. 2,385,586 describes the reaction of a solution or dried powder of spent sulfite liquor with a phenolic compound in a mineral acid at a pH of less than 4 and at a temperature of 50° C. to 150° C. Similarly, U.S. Pat. No. 2,772,139 discloses the reaction of a calcium-based spent sulfite liquor having 10%–50% solids content with sulfuric acid to remove the calcium, and then reacting the mixture with an excess of phenolic compound at 100° C. to 150° C. In each instance, a sealed, acid-resistant autoclave is required.

U.S. Pat. No. 2,772,140 describes the removal of calcium ions from a calcium-based spent sulfite liquor having 10%–50% solids content by ion exchange and then reacting it with an excess of phenolic compound at 100° C. to 150° C. by reflux or in a sealed, acid-resistant autoclave. The resulting product, containing a phenol derivative of a spent sulfite liquor and unreacted phenol, can be used to prepare a thermosetting resin by reacting it with an aldehyde as described in U.S. Pat. No. 2,794,790. The resulting resin may be used as a binder in the manufacture of wood products. The formation of the phenol derivative is costly because of the ion exchange step and the need for the acid-resistant autoclave.

This latter disadvantage is also present in the process of preparing a phenol-reacted spent sulfite liquor as described in *Chemical Abstracts* 80:P147112Y. In this process, concentrated spent sulfite liquor is reacted with phenol at 160° C. to 200° C. and at a pH of 5.1–7.2 in an autoclave. A water-resistant adhesive can be prepared by reacting the product with an aldehyde in an alkaline solution.

Finally, U.S. Pat. No. 4,127,544 discloses a phenol-reacted, ammonium-based lignosulfonate prepared by dissolving or suspending a solid, ammonium-based spent sulfite liquor in phenol and heating the mixture to 150° C. to 300° C. under autogenous pressure until the reacted mass is water-insoluble but soluble in aqueous sodium hydroxide. The ratio of ammonium lignosulfonate to phenol may be 2:1–1:10. The resulting product may be reacted with an aldehyde to make an exterior grade resin adhesive.

The prior art also further shows the reaction of phenol with lignosulfonate at an alkaline pH. U.S. Pat. Nos. 3,597,375 and 3,658,638 disclose heating an alkali metal lignosulfonate with phenol at 90° C. to 180° C. and at pH 9–12. The product can then be reacted with an aldehyde under alkaline conditions to form an adhesive useful for plywood manufacture. This process, however, suffers from the following disadvantages. The sugars which are present in the spent sulfite liquor and which are undesirable for resin formulations are not decreased in concentration by the reaction at a highly alkaline pH. In addition, the reaction requires the spent sulfite liquor be converted to sodium-based spent sulfite liquor.

Sakanen, K. V., *27th Int. Cong. of Pure & Applied Chem.*, Varmavuori, A., Ed., Pergamon Press, Oxford, pp. 299-306 (1980) is a review of lignin and phenolic polymers. The reaction of lignin sulfonates with phenol at acid, neutral and basic pH and at temperatures of less than 200° C. is described. It was determined that phenol does not replace the sulfonate groups at near-neutral pH.

An additional reaction of spent sulfite liquors or lignosulfonates which has been described in the prior art is the oxidation of these materials. U.S. Pat. No. 2,470,764 describes the oxidation of spent sulfite liquor using an oxidizing agent, such as hydrogen peroxide. The use of hydrogen peroxide or persulfates of oxidize spent sulfite liquor under acidic conditions is disclosed in U.S. Pat. No. 3,388,061. This oxidation can be carried out to form a free-flowing powder as disclosed in U.S. Pat. Nos. 3,476,740 and 3,544,460.

*Chemical Abstracts* 98:73516f (1982) describes the oxidation of spent sulfite liquor with air or oxygen at 140° C. to 180° C. until a pH of 3-6 has been obtained. The product is then reacted with phenol and formaldehyde to form an adhesive for wood laminates. Nimz, H. H. et al, *Applied Polymer Symposium*, No. 28, John Wiley & Sons, Inc., pp. 1225-1230 (1976) disclose the oxidation of spent sulfite liquor under neutral conditions with the use of hydrogen peroxide and potassium ferricyanide. The oxidation generates phenoxy radicals which couple to cross-link the spent sulfite liquor.

Desulfonation and dimethylation can occur if the lignosulfonates are treated with caustic alkali at elevated temperatures. U.S. Pat. No. 3,551,405 discloses that this reaction with spent sulfite liquid results in desulfonation, to produce a desulfonated lignin resin. U.S. Pat. Nos. 2,491,832 and 4,219,471 disclose that this reaction in the presence of air results in an oxidized, partially desulfonated product. U.S. Pat. No. 2,505,304 discloses that the alkaline hydrolysis of lignosulfonate under pressure and at elevated temperatures causes demethylation.

U.S. Pat. No. 2,849,314 describes a process of treating spent sulfite liquor to produce reactive nitrogen-containing compositions capable of condensation with reactive aldehydes to form thermosetting resins. The process comprises removing inorganically combined sulfur from the liquor with addition of lime, heating the liquor from about 275° F. to 350° F. in the presence of ammonia and an oxygen-containing gas for a sufficient time to impart a substantial nitrogen content to an acid precipitable component. The oxygen-containing gas is utilized to oxidize the sugars present in the spent sulfite liquor.

Although the prior art describes many processes for treating spent sulfite liquor in an attempt to use the treated liquor for binders or adhesives, the products still suffer from one or more of the disadvantages described above. For example, if the spent sulfite liquor is desulfonated and oxidized to reduce the sugars content, the treated liquor still contains insufficient reaction sites to react with an aldehyde and/or to cross-link with a phenol-aldehyde resin. The present invention obviates the disadvantages of the prior art.

The invention provides a new and economical process for manufacturing phenol-reacted spent sulfite liquor. The reaction can be carried out at moderate acidity and temperature. Therefore, the process does not require acid-resistant and pressure equipment. The process reduces a substantial amount of the sulfonic acid groups from the molecule of lignosulfonate so that the cured resin is durable and has a low hydrophilic property. The process further reduces a substantial amount of the sugars present in the spent sulfite liquor, so that the cured resin is invulnerable to biological degradation. Finally, the phenol-reacted spent sulfite liquor is reactive with aldehyde and able to cross-link with phenol-aldehyde resins. It can be used for a thermosetting resin formulation by further reacting with aldehyde, and it functions as a reactant. Consequently, a substantial amount of phenol can be replaced with the phenol-reacted spent sulfite liquor in a resin formulation.

SUMMARY OF THE INVENTION

The invention provides a phenolic compound-modified spent sulfite liquor. The modified spent sulfite liquor contains 4%-25% reacted phenolic compound based on the dry weight of the original spent sulfite liquor. The modified liquor also contains a decreased sugars content of at least 20%, preferably 30%, and a reduced number of sulfonic acid groups of at least 20%, preferably 30%, over the original liquor. The modified spent sulfite liquor is suitable for use in thermosetting resin formulations since it has a reduced sulfonic acid group and sugars content.

The modified spent sulfite liquor is prepared by reacting a phenolic compound with spent sulfite liquor in the presence of an oxidizing agent. In general, the spent sulfite liquor is homogeneously mixed with a molten phenolic compound which has been preheated to 30° C. to 50° C. above the melting point. The ratio of spent sulfite liquor to phenol is 0.3:1-1.5:1 on a dry weight basis. An oxidizing agent is then added and the temperature increased to 120° C. to 160° C. for 1-6 hours. The modified spent sulfite liquor is then cooled. Vapors formed during the reaction are continuously removed by distillation. The distillate may optionally be added to the modified spent sulfite liquor for preparing a thermosetting resin formulation.

In the process, a significant amount of the sulfonic acid groups of the lignosulfonate are removed and a substantial amount of the phenolic compound is condensed with the lignin molecule. The aromatic moiety of the lignosulfonate is not significantly degraded by the process.

A wide variety of resin products of both resole and novolac types can be formulated from the phenolic compound-modified spent sulfite liquor with the advantage of lower cost than the products made from conventional phenolic resins. The resins made from the modified spent sulfite liquor can be used for wood product adhesives, paper impregnation resins, foaming resins, molding compounds, and binders of inorganic materials.

In addition to reducing the number of sulfonic acid groups and the sugars content, the process also has the following advantages. The reaction can be carried out at a wide range of initial pH values from slightly alkaline to acidic conditions. Therefore, the reaction condition can be selected to be less corrosive to a steel reactor. The reaction may be carried out at the temperature below the boiling point of phenol so that no pressure reactor is required. Air pollution is minimized as the distillate and the gases generated from the reaction are scrubbed in an alkaline solution. Water pollution is minimized as the recovered distillate can be added to the product of phenolic compound-modified spent sulfite liquor. Finally, a low-cost ammonium-based spent sulfite liquor can be used as the raw material for the reaction.

DETAILED DESCRIPTION OF THE INVENTION

It has now been discovered that spent sulfite liquor can be modified so that it contains phenol reactive groups, a reduced number of sulfonic acid groups and a reduced amount of sugars. The spent sulfite liquor is modified by reacting it with a phenolic compound in the presence of an oxidizing agent. The modified spent sulfite liquor can be used to prepare thermosetting resins.

In the process according to the invention, a spent sulfite liquor is mixed with a molten phenolic compound until a homogeneous mix is obtained. An oxidizing agent is gradually added to the mixture so the temperature does not exceed 90° C. The mixture is first raised to 100° C. to 120° C. and then finally to 120° C. to 160° C., for a total time of 1.5–6 hours. During the reaction, the vapors are continuously removed by distillation. The distillate may be added to the modified spent sulfite liquor.

Any spent sulfite liquor may be used in the present process within certain parameters. Examples include sodium-, magnesium-, and ammonium-based spent sulfite liquor. It is preferred to use an ammonium-based spent sulfite liquor. One parameter which the spent sulfite liquor should meet is that it should not have a high ash content. It is not desirable to have a high ash content since the ash contributes to the undesired hydrophilic property of the cured resin. The ash content should be below 7%, preferably below 3%, based on the solids content of the spent sulfite liquor. A second parameter is that the spent sulfite liquor should not have a high reducing sugars content. The sugars content should be below 25%, preferably below 15%, based on the solids content of the spent sulfite liquor. If the spent sulfite liquor contains more than 25% of reducing sugars, the amount of sugars can first be reduced by fermenting the spent sulfite liquor by prior art techniques.

Since water is continuously removed during the process, it is preferred that a high solids content, spent sulfite liquor be utilized. A spray-dried product and a liquid spent sulfite liquor having a solids content of at least 60% are peferred. It is also possible to use a spent sulfite liquor having a solids content of less than 60%. Thus, commercial spent sulfite liquors having a solids content of about 40% or more can be utilized. If a low solids content liquid, spent sulfite liquor is available it is preferred that it be concentrated to a 60% solids content level by vacuum distillation or other well-known techniques. This concentration can occur prior to adding the liquor to the phenolic compound after the liquor, phenolic compound and oxidizing agent have been mixed together.

The spent sulfite liquor is gradually added onto a phenolic compound which has been heated to a temperature about 30° C. to 50° C. above its melting point. The mixture is mixed continuously until a homogeneous mass is formed. The phenolic compound functions as a reagent for the reaction and as a solvent for the spent sulfite liquor. Any phenolic compound which is utilized in forming thermosetting resins can be utilized. The particular phenolic compound which is used will depend on the end use of the modified spent sulfite liquor. Examples of phenolic compounds include phenol, resorcinol, catechol, 2-cresol, 3-cresol, 4-cresol, 2,4-xylenol, 3,4-xylenol, 2,5-xylenol or mixtures thereof. Since phenol is the most widely used phenolic compound in phenolic resin manufacture, it is preferred.

The proportion of the spent sulfite liquor can vary by a wide range depending on the mixability of the phenolic compound and the spent sulfite liquor, the end use of the modified spent sulfite liquor, and economic considerations. In general, a weight ratio of spent sulfite liquor to phenol of 0.3:1–1.5:1 can be used. It is preferred to use a ratio of 0.5:1–1.1:1. A mixing difficulty will occur when a ratio of greater than 1.3:1 is used. Generally, the modified spent sulfite liquor is not economical if the weight ratio is below 0.3:1.

The acidity of the phenolic compound and spent sulfite liquor mix affects the phenolation reaction, properties of the phenolated product and corrosion to a steel reactor. The acidity of the phenolic compound and spent sulfite liquor mix is determined by measuring the pH value of an aqueous solution containing 30% solids of the mix of phenolic compound and spent sulfite liquor.

The phenolation reaction is carried out preferably under acidic conditions. During the phenolation reaction, pH values usually decrease to acidic condition even though the initial pH of the mix of the phenolic compound and spent sulfite liquor has been adjusted to a moderately alkaline condition. In general, the initial pH is 2.0 to 9.5, and the preferred pH is 3.0 to 8.0. The desired pH of the mix of the phenolic compound and spent sulfite liquor can be obtained by adjusting with alkaline or acid solution.

Although high acidity conditions, i.e., below pH 1.5, are favorable for the phenolation reaction, corrosion of a steel reactor and undesirable self-condensation of spent sulfite liquor are disadvantages. Furthermore, the product of the self-condensed spent sulfite liquor is not soluble in alkaline solution, so that the phenolated product cannot be used for resin formulations.

After the homogeneous mix of the phenolic compound and spent sulfite liquor has been obtained, the oxidizing agent is gradually added to the mix. The oxidizing agent is added at a temperature of between 75° C. to 105° C., preferably 80° C. to 90° C. The oxidizing agent is added gradually since some exotherm occurs upon its addition, and it is desirable to maintain the temperature between 75° C. and 105° C., preferably 80° C. and 90° C.

The oxidizing agent is selected so that the aromatic rings of the lignosulfonate are not significantly degraded during the process. Oxidizing agents which may be used in the present invention include peroxosulfates, such as peroxodisulfuric acid ($H_2S_2O_8$) and peroxomonosulfuric acid ($H_2SO_5$) and their ammonium ion and alkali metal salts, such as ammonium persulfate (($NH_4$)$_2S_2O_8$), sodium persulfate ($Na_2S_2O_8$) and potassium peroxomonosulfate ($K_2SO_5$). Peroxides, such as hydrogen peroxide ($H_2O_2$) and its alkali metal and alkaline earth peroxides, such as sodium peroxide ($Na_2O_2$), potassium peroxide ($K_2O_2$), calcium peroxide ($CaO_2$), barium peroxide ($BaO_2$), and magnesium peroxide ($MgO_2$), can also be used as oxidizing agents. Other oxidizing agents which are suitable for the present invention are peroxo acids and their salts, such as sodium peroxocarbonate ($2Na_2CO_3.3H_2O_2$), potassium peroxocarbonate ($2KHCO_3.H_2O_2$), sodium peroxoborate ($NaBO_3.4H_2O$) and sodium peroxypyrophosphate ($Na_4P_2O_7.nH_2O_2$); organic peroxides, such as benzoyl peroxide; hypochlorites, such as sodium hypochlorite (NaOCl); nitrobenzene; periodates, such as sodium periodate; fremy's salt ($NO(SO_3K)_2$); metallic oxides, such as cupric oxide (CuO), manganese dioxide ($MnO_2$) and lead dioxide ($PbO_2$); iron salts, such as ferric chloride ($FeCl_3$); and copper salts, such as cupric chloride ($CuCl_2$). The oxidizing agent utilized for the present process can be any one of the above oxidizing agents, or a mixture of two or more of these agents. It is preferred to use the peroxosulfates and the peroxides.

The oxidizing agent is added to the homogeneous mix of the phenolic compound and spent sulfite liquor in an amount of 0.1–1.0 moles of oxidizing agent per kilogram of the solids-based spent sulfite liquor. The preferred amount of oxidizing agent is 0.3–0.6 moles per kilogram.

Peroxides such as hydrogen peroxide and alkali metal and alkaline earth peroxides and peroxo acids are unstable in spent sulfite liquor due to the great number of metallic ion impurities in the spent sulfite liquor. Therefore, a stabilizer which is able to inactivate the metallic impurities is required to be used in combination with these oxidizing agents.

The stabilizer may be selected from the agents which are able to absorb, to form complex, or to chelate with the metallic ions. Thus, silicic and stannic acids, magnesium hydroxide, dehydrated alkali metal phosphates such as sodium tripolyphosphate, or a chelating agent such as ethylenediaminetetraacetic acid (EDTA) are able to inactivate the metallic impurities and to stabilize the oxidizing agent. The preferred stabilizers are magnesium oxide and sodium silicate.

The quantities of the stabilizer needed have to be in excess of that required by the total metallic impurities present in the spent sulfite liquor. Generally, 0.1–1.0 moles of a stabilizing agent per kilogram of solids-based spent sulfite liquor is utilized. It is preferred to use 0.2–0.6 moles of the stabilizer per kilogram of solids-based spent sulfite liquor. It is also preferred to added the stabilizer to the homogeneous mix before the oxidizing agent is added.

After the oxidizing agent has been added to the mix, it is preferred, although not necessary, to first process the reaction at a temperature of 100° C. to 125° C. for 30–190 minutes, preferably 30–60 minutes. If a liquid spent sulfite liquor is used, it is preferred to apply vacuum distillation at this stage to remove water from the reaction system. Water is removed in order to raise the temperature to the desired level. The primary reaction occurring at this stage is the oxidation of the sugars and the lignosulfonate.

After this time period, the reaction temperature is raised to 120° C. to 160° C., preferably 130° C. to 150° C. At this stage, the primary reaction which occurs is the phenolation reaction. The reaction is conducted for 1–6 hours, preferably 2–3 hours. The total time of the reaction includes the time utilized to raise the temperature to the desired level as well as the maintenance of that temperature. It is preferred to gradually raise the temperature to the desired level. During the reaction, the vapors of water, the phenolic compound and other malodorous gases are continuously removed by distillation. It is preferred that the vapors and gases be scrubbed through a 10%–50%, preferably 20%–30%, sodium hydroxide solution.

Although the present invention is not bound by any theoretical considerations, it is believed that desulfonation and demethylation of lignosulfonate occurs when lignosulfonate is oxidized by the oxidizing agent. Therefore, the reaction sites for the reaction with the phenolic compound are generated from desulfonated lignosulfonate.

The demethylation reaction creates additional phenolic functional groups on the molecules of lignosulfonate. Thus, the demethylated and phenolated lignosulfonate produced by the invention is more reactive with formaldehyde and able to cross-link with a phenol-formaldehyde resin than the non-phenolated spent sulfite liquor.

The phenolic compound-modified spent sulfite liquor resulting from this process contains at least 4% to 25% reacted phenolic compound based on the dry weight of the original spent sulfite liquor. Preferably, the reacted phenolic compound content is 8% to 16%, with about 10% being the most preferred. The modified liquor also has a decreased sugars content of at least 20%, and preferably 30%, over the original liquor. It is most preferred that the decrease in sugars content be at least 35%. The modified spent sulfite liquor also has a reduced number of sulfonic acid groups of at least 20% over the original liquor. It is preferred that the number of sulfonic acid groups be reduced by at least 30%, and most preferably reduced by at least 35%.

The phenolic compound-modified spent sulfite liquor can be used directly to prepare resin products. It is preferred, however, that the distillate be added to the modified spent sulfite liquor when it is to be used for preparing a thermosetting resin. It is desirable to add the distillate to the modified spent sulfite liquor for several reasons. First, the unreacted phenol is recovered and used in preparing the final resin product. Secondly, the caustic solution is recovered and is also used in preparing the final resin product. Finally, the use of the distillate in this manner reduces environmental problems which would be associated with the discharge of the by-products found in the distillate. These by-products, although a problem for water pollution, do not adversely affect the final resin product.

The phenolic compound-modified spent sulfite liquor can be used to form resole and novolac types of resin products. The modified liquor can be used in place of phenolic compounds or in combination with phenolic compounds to prepare wood product adhesives, paper impregnation resins, foaming resins, molding compounds and binders for inorganic materials.

Further details of the invention are shown in the examples which follow. All temperatures are in degrees Celsius unless specified otherwise. All compositions are expressed as parts by weight unless otherwise indicated. Brookfield viscosity was measured with a Brookfield viscometer using a No. 3 spindle, at 10–100 rpm, unless specified otherwise.

EXAMPLE 1

Analytical Techniques

The following analytical techniques were used to analyze the spent sulfite liquor and the product of the phenolated spent sulfite liquor in the examples. The materials were examined by high pressure liquid chromatography and infrared spectroscopy. The latter was utilized to determine sulfonic acid groups and para- and ortho-substituted phenol groups.

The high pressure liquid chromatography (HPLC) utilized the ALC/GPC-501 of Water Associates Inc., Milford, Mass. The sample for the HPLC was prepared by dissolving the spent sulfite liquor or phenolated spent sulfite liquor into a methanol/water solvent of 60/40 by weight ratio and filtering through a Millipore filter prior to injection. The sample concentration was about 1%. The analysis was achieved by employing an isocratic ambient elution. The HPLC was operated under the following conditions:

Column: $\mu$-bondpak C18
Detector: Refractive index
Solvent: Methanol/water of 60/40 by weight
Flow Rate: 0.5 ml/min.
Temperature: Room temperature (25° C.)

The liquid chromatographic method detected three fractions which represent lignosulfonic acids, sugars and phenol. Therefore, the lignosulfonic acids, sugars and phenol can be determined qualitatively and quantitatively. For quantitative analysis, the peak areas were measured using a planimeter.

For the infrared spectroscopic method, the sample was prepared by dialysis and cation exchange so that pure phenolated lignosulfonic acids were obtained.

For dialysis, Spectra/por 3 membrane tubing with 3500 molecular weight cutoffs was used. Phenolated spent sulfite liquor was diluted to 20%-30% solids content and then dialyzed against running tap water for at least 200 hours. After the dialysis, no trace of free phenol and sugars were detected by high pressure liquid chromatography (HPLC) with 280 nm UV and refractive index detectors.

The cations of the dialyzed sample were further removed by passing through an ion exchange column. The ion exchange resin was DOWEX HCR of Dow Chemical of Canada. The purified phenolated lignosulfonic acids were then dried by a rotary evaporator at 50° C.

The IR spectrum was made by scanning a KBr disc sample by an absorbance scan mode using a Perkin Elmer 681 infrared spectrometer. Assignment of the IR absorption bands is as follows:

650 cm$^{-1}$: sulfonic acid groups
750 cm$^{-1}$: ortho-substituted phenols
820 cm$^{-1}$: para-substituted phenols
1600 cm$^{-1}$: aromatic ring systems Therefore, the contents of sulfonic groups, ortho-substituted and para-substituted phenols can be shown by the absorbance ratios of A650/A1600, A750/A1600, and A820/A1600, respectively.

EXAMPLE 2

A phenol-modified spent sulfite liquor was prepared utilizing the following components as described.

| Ingredient | Parts by Weight |
| --- | --- |
| Phenol (100% concentration) | 100 |
| Orzan A (6% moisture content) | 106 |
| Ammonium persulfate ((NH$_4$)$_2$S$_2$O$_8$) | 6 |
| Sodium hydroxide (50% concentration) | 17 |

Orzan A is a trade name for a spray-dried powder of ammonium-based, spent sulfite liquor. It contains about 57% lignosulfonic acids, 15% reducing sugars, 1.5% ash and 6% moisture. The product is supplied by Crown Zellerbach Corporation of Camas, Wash.

Molten phenol was first charged into a reactor equipped with a heating mantle, mixer and condenser which was set for distillation. The phenol was heated to 85° C., and then Orzan A was gradually added with continuous stirring. The pH of a 30% aqueous solution of the phenol and Orzan A mix was 2.9. After phenol and Orzan A were mixed homogeneously, the ammonium persulfate was added slowly in a period of about 20 minutes. A sample was taken for analysis of the initial phenol content. The temperature was raised to 115° C. and held for 30 minutes, then raised to 150° C. for 175 minutes. Vapors formed during the reaction were continuously removed by distillation. The temperature was then cooled to below 90° C., and the distillate was mixed with the phenol-reacted Orzan A. After homogeneously mixing, another sample was taken for analysis of the final phenol content. The sodium hydroxide solution was then added to the phenol-reacted Orzan A to reduce the viscosity. The reacted phenol content was 11.6% based on the bone-dry weight of Orzan A. It was determined from the difference between the initial and final phenol contents.

EXAMPLE 3

A thermosetting resin was prepared from the product of Example 2, utilizing the following components as described.

| Ingredient | Parts by Weight |
| --- | --- |
| Phenol reacted Orzan A (from Example 2) | 36.93 |
| Formaldehyde (46.5% concentration) | 31.75 |
| Water | 21.86 |
| First Sodium Hydroxide (50% concentration) | 7.98 |
| Second Sodium Hydroxide (50% concentration) | 1.48 |

The phenol-reacted Orzan A from Example 2, formaldehyde solution and water were charged to a reactor. Then the first sodium hydroxide solution was slowly added over a 10-15 minute period, and the temperature was allowed to rise to 65° C. in 30 minutes. The temperature was held at 65° C. until the resin viscosity reached 100 cps of Brookfield viscosity at 25° C. Ten minutes after reaching this viscosity, the resin was cooled to below 50° C., and the second sodium hydroxide solution was added. Then the resin was continuously cooled to below room temperature. The resulting resin had a Brookfield viscosity of 103 cps at 25° C. The resin solids content was 45.9%, which was determined by Test Method No. 22 of West Coast Adhesive Manufacturers (WCAM).

The resin was further tested for making waferboards, and the internal bond and two-hour boil (accelerated aging) modules of rupture (MOR) of the boards were evaluated. Canadian Standard Association (CSA) standard CAN3-0188.0-M78 was followed. Laboratory size (28×28×1.27 cm) waferboards were made according to conventional Canadian waferboard mill conditions. Thus, a commercial aspen wood waferboard furnish with 2.1% moisture content was sprayed with a 2.5% resin solids based on dry wood weight. A laboratory type air sprayer and blender were used for the liquid resin application. The resin-sprayed wood furnish was formed into a mat and hot pressed to 1.27 cm (0.5 inch) thick waferboard. The hot pressing condition was 210° C. press temperature, 35 kg/cm$^2$ (500 psi) maximum press pressure and 5 to 7 minutes press times. The board density, internal bond strength and two-hour boil modulus of rupture are shown in Table 1.

TABLE 1

| Press Time Min. | Board Density g/cm$^3$ | Internal Bond* KPa (psi) | Two-Hour Boil MOR** MPa (psi) |
| --- | --- | --- | --- |
| 5.0 | 0.69 | 436 (63.2) | 9.0 (1305) |
| 5.0 | 0.72 | 485 (70.3) | 9.6 (1386) |
| 6.0 | 0.69 | 485 (70.3) | 10.9 (1575) |
| 6.5 | 0.73 | 397 (57.6) | 9.6 (1386) |
| 7.0 | 0.69 | 472 (68.4) | 10.2 (1476) |

*average of 3 specimens
**average of 2 specimens

The results show that the waferboard made with the resin surpasses the requirements of CSA Standard CAN-3-1088.2-M78.

EXAMPLES 4-7

A series of experiments was carried out to evaluate the effect of different amounts of ammonium persulfate on the phenolation of Orzan A.

The reactions were performed in a three-neck flask in which molten phenol and Orzan A powder were mixed homogeneously at temperatures of 80° C. to 90° C. Then ammonium persulfate was added, and a sample was taken for the analysis of initial contents of lignosulfonate, sugars and phenol by a high pressure liquid chromatograph. The temperature was raised to 100° C. to 115° C. and held for 60 minutes. Then it was increased to 145° C. in 60 minutes and held at 145° C. for 180 minutes. The vapors formed during the reaction were continuously removed by distillation. After the reaction, the reacted mass was cooled to below 90° C. and then mixed with the distillate. A sample was taken for analysis of final contents of phenol-reacted lignosulfonate, sugars and residual phenol. The results are shown in Table 2.

TABLE 2

| Example | Parts by Weight | | | Decrease of Sugars* % | Reacted Phenol** % |
|---|---|---|---|---|---|
| | Phenol (100%) | Orzan A (94%) | Ammonium Persulfate | | |
| 4 | 100 | 106 | 6 | 43 | 8.0 |
| 5 | 100 | 106 | 4 | 55 | 4.3 |
| 6 | 100 | 100 | 15 | — | 16.0 |
| 7 | 100 | 106 | 12 | 67 | 16.0 |

*based on initial sugars content
**based on bone-dry weight of Orzan A

By the liquid chromatographic analysis, no phenol coupling and phenol sulfonation reactions were observed from all of the reactions of phenol and Orzan A in the presence of ammonium persulfate.

EXAMPLE 8

A phenol-modified spent sulfite liquor was prepared utilizing the following components as described.

| Ingredient | Parts by Weight |
|---|---|
| Phenol (100% concentration) | 100 |
| Orzan A (6% moisture content) | 127 |
| Ammonium persulfate (($NH_4)_2S_2O_8$) | 8 |

Molten phenol was heated to 100° C. and mixed with the Orzan A powder to form a homogeneous mass. Then the ammonium persulfate was added slowly in a period of 20 minutes. The temperature was raised to 160° C. in 270 minutes, and held at 160° C. for 90 minutes. Vapors formed during the reaction were continuously removed by distillation. After the reaction, the phenol-reacted Orzan A was cooled to 90° C. and mixed with the distillate. The reacted phenol was 14.2% based on bone-dry weight of Orzan A.

EXAMPLE 9

A phenol-modified spent sulfite liquor was prepared utilizing the following components as described.

| Ingredient | Parts by Weight |
|---|---|
| Phenol (100% concentration) | 100 |
| Orzan A (6% moisture content) | 106 |
| Sodium persulfate ($Na_2S_2O_8$) | 6 |

A mixture of phenol and Orzan A was prepared by mixing Orzan A with a 104° C. molten phenol, and then sodium persulfate was added slowly in a period of about 20 minutes. A sample was taken for analysis of the initial contents of lignosulfonate, reducing sugars and phenol by high-pressure liquid chromatography. The temperature was raised to 145° C. in 190 minutes and held at 145° C. for 150 minutes. Vapors formed during the reaction were continuously removed by distillation. After the reaction, the phenol-reacted spent sulfite liquor was cooled to 90° C. and mixed with the distillate. A sample was taken for analysis of the phenol-reacted lignosulfonate, sugars and final phenol content by high pressure liquid chromatography. The 30% aqueous solution of the final product had a pH of 3.0. As determined by the liquid chromatography, the reacted phenol was 14.4% based on bone-dry Orzan A. The samples of the phenol and spent sulfite liquor (Orzan A) mix taken before and after the reaction process were purified by dialysis against water and cation exchange. The samples were dried and analyzed by infrared spectroscopy. The phenolation process reduced about 35% of the sulfonic group. It also increased ortho- and para-substituted phenol by 197% and 43%, respectively.

EXAMPLE 10

A phenol-modified spent sulfite liquor was prepared utilizing the following components as described.

| Ingredient | Parts by Weight |
|---|---|
| Phenol (100% concentration) | 100 |
| Orzan A (6% moisture content) | 106 |
| Sodium persulfate ($Na_2S_2O_8$) | 6 |
| Sodium hydroxide (50% concentration) | 11 |

A molten phenol was heated to 90° C. and mixed with Orzan A to a homogeneous mix. To this mixture, sodium persulfate and sodium hydroxide solutions were added. The mix had a pH of 7.5 when it was measured at 30% solids aqueous solution. A sample was also taken for analysis of the initial contents of lignosulfonate, sugars and phenol. The temperature of the mix was raised to 115° C. and held for 60 minutes; then it was raised to 145° C. in 60 minutes and held at 145° C. for 180 minutes. Vapors were continuously removed by distillation. After the reaction, the temperature was cooled to 90° C., and the distillate was mixed with the phenolated spent sulfite liquor. A sample was taken for pH measurement and analysis of the final contents of phenolated lignosulfonate, sugars and phenol. A 30% solids aqueous solution of the phenol-reacted spent sulfite liquor had a pH of 5.0. The reacted phenol was 12.4% based on dry Orzan A.

EXAMPLE 11

A phenol-modified spent sulfite liquor was prepared utilizing the following components as described.

| Ingredient | Parts by Weight |
|---|---|
| Phenol (100% concentration) | 100 |
| Orzan A (6% moisture content) | 106 |
| Oxone | 4 |

Oxone ($2KHSO_5 \cdot KHSO_4 \cdot K_2SO_4$), a product of E. I. du Pont de Nemours & Co., contains 49.5% and 5.2% theoretical potassium peroxymonosulfate ($KHSO_5$) and active oxygen, respectively. The oxone was added to a homogeneous mix of phenol and Orzan A at 93° C. The initial pH was 3.5 when it was measured at 30% solids aqueous solution. A sample was taken for analysis of the initial contents of lignosulfonate, sugars and phenol. The temperature was raised to 110° C. and held for 60 minutes, then raised to 145° C. in 120 minutes and held for 120 minutes. Vapors were continuously removed by distillation. After the reaction, the reacted mass was cooled to below 90° C. and mixed with the distillate. A sample was taken for liquid chromatographic analysis for the phenol-reacted lignosulfonate, sugars and final phenol contents. The final pH was also measured of a 30% solids aqueous solution. The reacted phenol was 5% based on bone-dry weight of Orzan A and the final pH was 3.8.

EXAMPLE 12

A phenol-modified spent sulfite liquor was prepared utilizing the following components as described.

| Ingredient | Parts by Weight |
| --- | --- |
| Phenol (100% concentration) | 100 |
| Orzan A (6% moisture content) | 106 |
| Sodium Silicate ($Na_2SiO_3 \cdot 5H_2O$) | 19 |
| Magnesium Sulfate ($MgSO_4 \cdot 7H_2O$) | 0.4 |
| Sodium Hydroxide (50% concentration) | 3.4 |
| Hydrogen Peroxide (19.5% concentration) | 4.6 |

Molten phenol was heated to 75° C. and mixed homogeneously with Orzan A, sodium silicate, magnesium sulfate and sodium hydroxide. The pH of the mix was 7.6 when it was determined by a 30% solids content aqueous solution. The hydrogen peroxide solution was added to the mix: a sample was then taken for analysis of initial contents of lignosulfonate, sugars and phenol. The temperature was raised to 125° C. and held for 120 minutes. It was further increased to 145° C. in 100 minutes, and held for 140 minutes. Vapors formed during the reaction were continuously removed by distillation. After the reaction, the mass was cooled to below 90° C. and mixed with the distillate. A sample was taken for pH measurement and analysis of phenolated lignosulfonate, sugars and final phenol contents by liquid chromatography. The final pH was 5.1, as determined by a 30% solids aqueous solution. The reacted phenol content was 10.4% based on dry Orzan A. By comparing the infrared spectra of the exhaustively dialyzed and cation exchanged samples taken before and after the phenolation process, the phenolation process reduced 33% of sulfonic groups from the lignosulfonate. It also increased the ortho-substituted phenol by 3.5 times over the non-phenolated lignosulfonate. Nevertheless, no increase of para-substituted phenol was observed.

EXAMPLE 13

A phenol-modified spent sulfite liquor was prepared utilizing the following components as described. A 49% solids content of ammonium-base spent sulfite liquor was obtained from a sulfite pulp mill of Western Forest Products, Ltd., Port Alice, B.C., Canada. The sample was further concentrated to 75% solids content at 100° C. temperature by vacuum distillation. By dry basis, the spent sulfite liquor contained 61% ammonium lignosulfonate, 25% sugars and 1.2% ash content. The reaction used the following components:

| Ingredient | Parts by Weight |
| --- | --- |
| Phenol (100% concentration) | 100 |
| Spent sulfite liquor (25% moisture content) | 133 |
| Ammonium persulfate (($NH_4)_2S_2O_8$) | 6 |

Molten phenol was heated to 96° C. and mixed with the spent sulfite liquor. Then the ammonium persulfate was added to the mix. A sample was taken for analysis of lignosulfonate, sugars and phenol. The temperature was first raised to 116° C. and held for 170 minutes. It was further increased to 145° C. in 200 minutes and held for 115 minutes. Vapors formed during the reaction were continuously removed by distillation. After the reaction, the mass was cooled to below 90° C. and mixed with the distillate. A sample was taken for analysis of the phenol-reacted lignosulfonate, sugars and phenol contents by liquid chromatography. By the reaction process, the reacted phenol was 16.6% based on bone-dry weight of the spent sulfite liquor, and the sugars decreased by 44.8% based on the initial sugars content.

EXAMPLE 14

A thermosetting resin was prepared from the product of Example 13 utilizing the following components as described.

| Ingredient | Parts by Weight |
| --- | --- |
| Phenol reacted spent sulfite liquor (from Example 13) | 40.40 |
| Formaldehyde solution (47.0% concentration) | 31.41 |
| Water | 18.73 |
| First sodium hydroxide (50% concentration) | 7.98 |
| Second sodium hydroxide (50% concentration) | 1.48 |
| Total | 100.00 |

The phenol-reacted spent sulfite liquor prepared in Example 13, formaldehyde solution and water were first charged in a resin reactor. Then the first sodium hydroxide solution was slowly added over a 10-15 minute period, and the temperature was allowed to rise to 65° C. The temperature was held at 65° C. for 210 minutes. Brookfield viscosity of the resin was 145 cps at 25° C. The resin was then cooled to below 50° C. and the second sodium hydroxide solution was added. The resin was further cooled to below room temperature. The final resin Brookfield viscosity was 140 cps at 25° C. It had a solids content of 43.8% determined by Test Method No. 22 of West Coast Adhesive Manufacturers. The resin was evaluated by making waferboard and tested for internal bond, and the two-hour boil (accelerated aging) modulus of rupture (MOR). Canadian Standards Association (CSA) Standard CAN3-0188.0-M78 was followed. Laboratory size (28×28×1.08 cm) boards were made according to conventional Canadian waferboard mill conditions. Thus, a commercial aspen wood waferboard furnish with 3.0% moisture content was sprayed with 2.5% resin solids based on dry wood weight. A laboratory type air-spray and blender were used for the liquid resin application. The resin-sprayed wood wafers were formed into a mat. The 1.08 cm (0.44 in.) thick board was made by hot pressing at 210° C.

press temperature for 4.0 to 6.5 minutes press times. The board density, internal bond strength and two-hour boil modulus of rupture are shown in Table 3.

TABLE 3

| Press Time Min. | Board Density g/cm³ | Internal Bond* KPa (psi) | Two-Hour Boil MOR** MPa (psi) |
| --- | --- | --- | --- |
| 4.0 | 0.64 | 351.6 (51.0) | 9.10 (1320) |
| 4.5 | 0.64 | 372.3 (54.0) | 10.51 (1524) |
| 5.0 | 0.64 | 429.5 (62.3) | 9.10 (1320) |
| 5.5 | 0.64 | 470.9 (68.3) | 13.24 (1920) |
| 6.0 | 0.64 | 487.5 (70.7) | 13.16 (1908) |
| 6.5 | 0.65 | 484.7 (70.3) | 10.84 (1572) |

*average of 3 specimens
**average of 2 specimens

The results show that the resin curing speed is acceptable to the waferboard industry. The board properties of internal bond and the two-hour boil MOR surpass the requirement of CSA Standard CAN3-0188.2-M78.

EXAMPLE 15

A phenol-modified spent sulfite liquor was prepared utilizing the following components as described.

| Ingredient | Parts by Weight |
| --- | --- |
| Phenol (100% concentration) | 100 |
| Spent sulfite liquor (41% concentration) | 244 |
| Manganese dioxide (85% concentration) | 3 |
| Sodium hydroxide (50% concentration) | 4 |

The spent sulfite liquor was a 41% solids content ammoniumbase spent liquor obtained from a sulfite pulp mill of Western Forest Products Ltd., Port Alice, B.C., Canada. A reactor was charged with phenol, spent sulfite liquor, manganese dioxide and sodium hydroxide. The pH of the mix was 7.6 when measured at a 30% solids content at 25° C. A sample was taken for determining the contents of lignosulfonate, sugars and phenol by liquid chromatography method. The mix was first distilled under vacuum at 100° C. for 180 minutes to remove water. Then the vacuum was released and the temperature was raised to 145° C. and held for 60 minutes. Vapors formed during the reaction were also removed by distillation. The reacted mass was then cooled to below 90° C. and mixed with the distillate. The final pH was 3.0 as measured at 30% solids content. A sample was taken for analysis of phenol-reacted lignosulfonate, sugars and phenol. By the process, the reacted phenol was 6.1% based on bone-dry weight of the spent sulfite liquor. The sugars decreased by 56.5% based on the initial sugars content.

EXAMPLE 16

A phenol-modified spent sulfite liquor was prepared utilizing the following components as described.

| Ingredient | Parts by Weight |
| --- | --- |
| Phenol (100% concentration) | 100 |
| Spent sulfite liquor (41% concentration) | 244 |
| Cupric oxide (CuO) | 2 |
| Sodium hydroxide (50% concentration) | 8 |

The 41% solids content ammonium-base spent sulfite liquor was obtained from Western Forest Products Ltd., Port Alice, B.C., Canada. A reactor was charged with phenol, spent sulfite liquor, cupric oxide and sodium hydroxide solution. The pH of the mix was 8.3 when measured by 30% aqueous solution. A sample was taken for analysis of lignosulfonate, sugars and phenol content by liquid chromatography. The mix was first distilled under vacuum at 100° C. for 190 minutes to remove water from the system. The vacuum was then released; the temperature was raised to 145° C. in 90 minutes and held at the temperature for 80 minutes. Vapors formed during the reaction were also removed by distillation. The reacted mass was then cooled to below 90° C. and mixed with the distillate. The final pH was 3.3 as determined by a 30% solids content aqueous solution. A sample was also taken for analysis of phenol-reacted lignosulfonate, sugars and phenol. The result of liquid chromatographic analysis shows that the reacted phenol was 9.4% based on dry weight of spent sulfite liquor. Sugars decreased by 47.4% based on the initial sugars content.

EXAMPLE 17

A phenol-modified spent sulfite liquor was prepared utilizing the following components as described.

| Ingredient | Parts by Weight |
| --- | --- |
| Phenol (100% concentration) | 100 |
| Spent Sulfite Liquor (48% concentration) | 206 |
| First Sodium Hydroxide (50% concentration) | 1 |
| Ammonium Persulfate | 2 |
| Magnesium Oxide | 2 |
| Second Sodium Hydroxide (50% concentration) | 9 |
| Hydrogen Peroxide (35% concentration) | 5 |

The 48.4% solids content ammonium-base spent sulfite liquor was obtained from Western Forest Products Ltd., Port Alice, B.C., Canada. The spent sulfite liquor was first charged into a reactor and concentrated to 60% solids content by vacuum distillation at 80° C. Then phenol, first sodium hydroxide and ammonium persulfate were added to the concentrated spent sulfite liquor. The total mix had a pH of 4.2 as determined by 30% solids content aqueous solution at 25° C. A sample was taken for determining the initial contents of lignosulfonate, sugars and phenol by liquid chromatography. The mix was heated to 80° C. and held for 60 minutes. Then magnesium oxide, second sodium hydroxide and hydrogen peroxide were added to the mix. The pH at 25° C. was 8.6 as determined from a 30% solids content aqueous solution. The mixture was heated to 110° C. and vacuum distilled to a scrubber trap containing 27 parts by weight of 25% sodium hydroxide solution for 125 minutes. The sodium hydroxide solution can scrub malodorous gases generated from the reaction. Then the vacuum was released; the temperature was raised to 145° C. in 135 minutes and held at 145° C. for 180 minutes. Vapors formed during the reaction were removed by distillation and also scrubbed by 25% sodium hydroxide solution. After the reaction, the mixture was cooled to below 90° C. The distillate was added to the reactor. After mixing, a sample was taken for analysis of the contents of phenol-reacted lignosulfonate, sugars and phenol. The reacted phenol content is 12.5% based on the dry weight of spent sulfite liquor. The sugars content was reduced by 67%.

EXAMPLE 18

A phenol-modified spent sulfite liquor was prepared utilizing the following components as described.

| Ingredient | Parts by Weight |
|---|---|
| Phenol (100% concentration) | 100 |
| Spent Sulfite Liquor (41% concentration) | 244 |
| Magnesium Oxide | 2 |
| Hydrogen Peroxide (35% concentration) | 5 |

A 41% solids content ammonium-base spent sulfite liquor from Western Forest Products Ltd., Port Alice, B.C., Canada was concentrated to 60% solids by vacuum distillation at 100° C. to remove 77 parts of water. The distillate was received in a trap containing 54 parts of 25% sodium hydroxide solution. Phenol and magnesium oxide were mixed with the concentrated spent sulfite liquor. The pH was 8.0 as determined by 30% solids content aqueous solution. Hydrogen peroxide was then added. A sample was taken for analyzing the initial contents of lignosulfonate, sugars and phenol. The temperature was raised to 145° C. in 150 minutes and held at the temperature for 120 minutes. Vapors formed during the reaction were continuously removed by distillation and scrubbed in the 25% sodium hydroxide solution to remove malodorous gases. After the reaction, the reacted mass was cooled to below 90° C. and mixed with the distillate contained sodium hydroxide solution. A sample was taken for analysis of the contents of phenol-reacted lignosulfonate, sugars and phenol. The reacted phenol content was 8.7% based on dry weight of the spent sulfite liquor. The sugars content was reduced by 39.0% based on the initial sugars content.

EXAMPLE 19

A thermosetting resin was prepared from the product of Example 18 utilizing the following components as described.

| Ingredient | Parts by Weight |
|---|---|
| Phenol-reacted spent sulfite liquor (from Example 18) | 57.94 |
| First formaldehyde (46.5% concentration) | 20.13 |
| First sodium hydroxide (50% concentration) | 1.30 |
| Second formaldehyde (46.5% concentration) | 7.98 |
| Second sodium hydroxide (50% concentration) | 4.07 |
| Third sodium hydroxide (50% concentration) | 3.64 |
| Fourth sodium hydroxide (50% concentration) | 4.94 |
| Total | 100.00 |

A reactor was charged with the phenol-reacted spent sulfite liquor made in Example 18 and the first formaldehyde. The first sodium hydroxide solution was added slowly in 10–15 minutes, and the temperature was allowed to rise to 65° C. in 30 minutes. Then the second formaldehyde was added and the temperature was held at 65° C. for a further 20 minutes. Thereafter, the second sodium hydroxide was added and the temperature was allowed to rise to 85° C. in 10 minutes. The temperature was held at 85° C. until the viscosity reached 600 cps at 25° C. of Brookfield Model RVF 100. Ten minutes after reaching 600 cps, the third sodium hydroxide was added; again the temperature was held at 85° C. until the mixture reached a viscosity of 1100 cps at 25° C. Ten minutes after reaching 1100 cps, the resin was cooled to 75° C. and the fourth sodium hydroxide was added. The resin was further reacted at 75° C. until a viscosity of 620 cps at 25° C. was reached. Ten minutes after reaching 620 cps, the resin was cooled to below room temperature. The results of the resin analysis are as follows:

| | |
|---|---|
| Non-volatile content: (WCAM Test Method No. 2.2) | 45.0% |
| Free sodium hydroxide content: | 8.1% |
| Brookfield viscosity (25° C.) | 630 cps |

The resin was evaluated for making plywood. A glue mix for plywood making was prepared as follows:

| Ingredient | Parts by Weight |
|---|---|
| Resin | 69.9 |
| Wheat Flour | 5.1 |
| Walderfil | 4.4 |
| Plybond AC | 4.4 |
| Soda Ash | 2.0 |
| Water | 14.2 |
| Total | 100.0 |

Walderfil is a bark powder of alder wood supplied by Laurence and David Inc.; Plybond AC is an acid digested corn cob material supplied by Asbury Graphite Inc. of California. A glue mix was prepared by mixing the resin with wheat flour, walderfil, plybond AC, soda ash and water until a homogeneous mass was obtained. The viscosity of the glue mix was 266 MacMichael (24 rpm) with disc and No. 26 wire at 21° C. The glue mix of the resin was then evaluated for making plywood with different press times and open assembly times at the pressing condition similar to the industrial plywood making. Therefore, five-ply plywoods were made from the glue mix and freshly sanded commercial spruce veneers of 0.25 cm (0. in.) and 0.42 cm (0.17 in.) thicknesses. For each plywood panel, the glue mix was first spread on two 0.42 cm thick veneers at 0.28 kg/m² double glue lines (57 pounds/1,000 ft² double glue lines). Then a five-ply veneer assembly was made by assembling the two glue spread veneers and 0.25 cm thick veneers at cross-wood grain direction. The plywood was made by hot pressing the veneer assembly at a hot press temperature of 149° C. (300° F.) and pressure of 14.1 kg/cm² (200 psi) with different press times from 4.5 to 7.0 minutes. The open assembly times were from 10 to 60 minutes. Open assembly time means the time interval between the spreading of glue mix on veneer and assembly of the veneers for bonding. The hot pressed plywoods were further post-cured in a 100° C. oven for two hours to simulate hot stacking under plywood mill conditions. The glue bond of the plywood was tested for shear strength and wood failure according to CSA Standard 0151-M1978 for vacuum/pressure cycle and boil/cold water cycle tests. The boil/cold water cycle test was performed by subjecting the plywood shear specimen to three consequtive cycles of immersion in boiling water for 10 minutes, followed immediately by immersion in cold water for a period of 10 minutes. The results are shown in Table 4.

TABLE 4

| Open Assembly Min. | Press Time Min. | Vacuum/Pressure* | | Boil/Cold Water* | |
|---|---|---|---|---|---|
| | | Shear Kpa (psi) | Wood Failure % | Shear Kpa (psi) | Wood Failure % |
| 10 | 4.5 | 792 (115) | 45 | 655 (95) | 50 |
| 10 | 5.0 | 620 (90) | 32 | 494 (72) | 34 |
| 10 | 5.5 | 540 (78) | 80 | 540 (78) | 82 |
| 10 | 6.0 | 609 (88) | 74 | 552 (80) | 83 |
| 10 | 7.0 | 689 (100) | 62 | 609 (88) | 84 |
| 20 | 6.0 | 1324 (163) | 83 | 827 (120) | 83 |
| 30 | 6.0 | 609 (88) | 90 | 460 (67) | 87 |
| 40 | 6.0 | 710 (103) | 85 | 848 (123) | 88 |
| 60 | 6.0 | 745 (108) | 93 | 551 (80) | 89 |

*average of 6 specimens

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A modified spent sulfite liquor which comprises a spent sulfite liquor by product of sulfite pulping processes having 4%-25% reacted phenolic compound based on the dry weight of said spent sulfite liquor, a decreased sugars content of at least 20% based on the sugars content of said spent sulfite liquor and a reduced number of sulfonic acid groups of at least 20% based on the sugars content of said spent sulfite liquor.

2. The liquor of claim 1 wherein said phenolic compound is selected from the group comprising phenol, resorcinol, catechol, 2-cresol, 3-cresol, 4-cresol, 2,4-xylenol, 3,4-xylenol, 2,5-xylenol or mixtures thereof.

3. The liquor of claim 1 wherein said phenolic compound is phenol.

4. The liquor of claim 1 wherein said reacted phenolic compound is 8%-16%, said decreased sugars content is at least 30%, and said reduced numbers of sulfonic acid groups is at least 30%.

5. The liquor of claim 4 wherein said phenolic compound is selected from the group comprising phenol, resorcinol, catechol, 2-cresol, 3-cresol, 4-cresol, 2,4-xylenol, 3,4-xylenol, 2,5-xylenol or mixtures thereof.

6. The liquor of claim 4 wherein said phenolic compound is phenol.

7. The liquor of claim 1 which further comprises the distillate of vapors of a reaction of a phenolic compound with a spent sulfite liquor under oxidizing conditions.

8. The liquor of claim 7 wherein said phenolic compound is phenol.

9. The liquor of claim 4 which further comprises the distillate of vapors of a reaction of a phenolic compound with a spent sulfite liquor under oxidizing conditions.

10. The liquor of claim 9 wherein said phenolic compound is phenol.

11. A process for preparing a phenolic compound-modified spent sulfite liquor which comprises:

adding a spent sulfite liquor by product of sulfite pulping processes to molten phenolic compound at 30° C. to 50° C. above its melting point in a weight ratio of said liquor to said phenolic compound of 0.3:1-1.5:1 on a dry weight basis, adding 0.1-1.0 moles of an oxidizing agent per kilogram of solids-based spent sulfite liquor to the resulting mixture, and heating the resulting mixture to 120° C. to 160° C.

12. The process of claim 11 wherein said weight ratio of said liquor to said phenolic compound is 0.5:1-1.1:1.

13. The process of claim 11 wherein 0.3-0.6 moles of oxidizing agent are utilized.

14. The process of claim 11 wherein the phenolic compound is selected from the group comprising phenol, resorcinol, catechol, 2-cresol, 3-cresol, 4-cresol, 2,4-xylenol, 3,4-xylenol, 2,5-xylenol or mixtures thereof.

15. The process of claim 14 wherein the phenolic compound is phenol.

16. The process of claim 11 wherein the oxidizing agent is selected from the group comprising peroxosulfates, peroxides, peroxoacids and their salts, organic peroxides, hypochlorites, nitrobenzene, periodates, fremy's salt, metallic oxides, iron salts, copper salts or mixtures thereof.

17. The process of claim 16 wherein the oxidizing agent is a peroxosulfate or a peroxide.

18. The process of claim 16 wherein 0.1-1.0 moles of stabilizer per kilogram of solids-based spent sulfite liquor is added prior to adding said oxidizing agent.

19. The process of claim 18 wherein 0.2-0.6 moles of stabilizer is utilized.

20. The process of claim 11 wherein the final mixture is heated to between about 100° C. to about 120° C. for 30-190 minutes before said heating to between about 120° C. to about 160° C.

21. The process of claim 11 wherein the vapors of the reaction are distilled and the distillate is added to the product.

22. A process for preparing a phenolic compound-modified spent sulfite liquor which comprises adding a spent sulfite liquor by product of sulfite pulping processes to a molten phenolic compound selected from the group comprising phenol, resorcinol, catechol, 2-cresol, 3-cresol, 4-cresol, 2,4-xylenol, 3,4-xylenol, 2,5-xylenol or mixtures thereof at 30° C. to 50° C. above its melting point in a weight ratio of said liquor to said phenolic compound of 0.5:1-1.1:1 on a dry weight basis, adding 0.3-0.6 moles per kilograms of solids-based spent sulfite liquor of an oxidizing agent selected from the group comprising peroxosulfates, peroxides, peroxoacids and their salts, organic peroxides, hypochlorites, nitrobenzene, periodates, fremy's salt, metallic oxides, iron salts, copper salts or mixtures thereof to the resulting mixture and heating the resulting mixture to 120° C. to 160° C. for 1-6 hours.

23. The process of claim 22 wherein said phenolic compound is phenol.

24. The process of claim 22 wherein said oxidizing agent is a peroxosulfate or a peroxide.

25. The process of claim 22 wherein 0.2-0.6 moles of stabilizer per kilogram of solids-based spent sulfite liquor is added prior to adding said oxidizing agent.

26. The process of claim 24 wherein 0.2-0.6 moles of stabilizer per kilogram of solids-based spent sulfite liquor is added prior to adding said oxidizing agent.

27. The process of claim 22 wherein the final mixture is heated to between about 100° C. to about 120° C. for 30-190 minutes before said heating to between about 120° C. to about 160° C.

28. The process of claim 22 wherein the vapors of the reaction are distilled and the distillate is added to the product.

* * * * *